United States Patent Office 3,663,454
Patented May 16, 1972

3,663,454
ACTIVATION OF HYDROCARBON CATALYST
USING SOLUTION
Robert M. Suggitt, Fishkill, and John H. Estes, Wappingers Falls, N.Y., assignors to Texaco Inc., New York, N.Y.
No Drawing. Filed June 15, 1967, Ser. No. 646,199
Int. Cl. B01j 11/78
U.S. Cl. 252—442
8 Claims

ABSTRACT OF THE DISCLOSURE

This invention and this disclosure are directed to an improved method for activating alumina and noble metal-alumina composites to prepare catalysts useful for hydrocarbon conversion, particularly isomerization. The invention revolves about activating the composite with a solution of hexachloroethane or octachloropropane which are normally solids at ambient conditions. The activation of the alumina or metal-alumina composite is performed by introducing the hexachloroethane activating agent in the form of a solution and treating the composite to be activated with the solution under activating conditions. A suitable solvent is tetrachloroethylene.

BACKGROUND OF THE INVENTION

Field of the invention

This invention resides in the field broadly known as the preparation of catalyst for use in hydrocarbon conversion. More particularly, this invention resides in the activation of alumina or noble-metal-alumina composites e.g. platinum alumina to render the catalst active for purpose of hydrocarbon conversion. Hydrocarbon conversion as utilized herein contemplates processes such as isomerization, alkylation, disproportionation and reforming.

Discussion of the prior art

In copending, and now abandoned, application Ser. No. 600,021, of Dec. 8, 1966, of John H. Estes, Stanley Kravitz and Robert Suggitt, entitled "Catalyst for Hydrocarbon Conversion" there is disclosed that hexachloroethane is useful for the activation of a platinum-alumina composite to render it catalytically active for isomerization, e.g. isomerization of lower alkanes, such as n-butane and n-hexane. The process of that invention is performed by treating a platinized alumina composite with the hydrocarbon together with chlorine or bromine. In that application there are other chlorocarbons taught for use in conjunction with the gaseous chlorine or bromine in the catalyst activation step.

Unfortunately, it was experienced that hexachloroethane due to the fact that it is a solid up to 368° F. normally presents difficulty in employing it in the activation of an alumina containing composite. This is unfortunate since most activating agents also suffer from some characteristics which make them undesirable for commercial use. Thus, the employment of hexachloroethane aside from the fact that it is a solid would be most desirable. The characteristics which makes some of the other activating agents undesirable include high corrosion rates, high cost, lack of availability and commercial quantities or inability to impart a high degree of activation to the alumina composite or other alumina composite being activated. Hexachloroethane, on the other hand, is not particularly a corrosive material, is available in commercial quantities at a reasonable cost and imparts a satisfactory activity to the alumina containing composite when evaluated in small scale catalyst preparation units. Hence, it is desirble to provide a method for utilizing the hexachloroethane as an activating agent without encountering the problem of dealing with it in a solid state. Essentially the same problems arise using octachloropropane.

SUMMARY OF THE INVENTION

Objects of the invention

It is an object of this invention, therefore, to provide a suitable commercially feasible method for activating an alumina containing composite for the purpose of rendering it useful as a hydrocarbon conversion catalyst.

It is another object of this invention, therefore, to provide a process for activating an alumina containing composite which does not entail the utilization of expensive chemicals or the like and which imparts to the catalyst the actvity required for the utilization of he caalyst on a commercial scale.

It is still another object of this invention, therefore, to provide a commercially feasible method whereby hexachloroethane is utilized to its fullest extent in the activation of alumina-noble metal composite e.g. a platinum-alumina composite.

These and other objects of this invention will become apparent from the following more complete description of the invention and the appended claims.

STATEMENT OF THE INVENTION

Broadly, this invention contemplates a process for activating an alumina composite with hexachloroethane or octachloropropane to render it active as a catalyst for hydrocarbon conversion which comprises treating the alumina composite to be activated with a solution of hexachloroethane in an atmosphere containing molecular oxygen, e.g. air or a chlorine or bromine atmosphere. When employing an oxygen containing atmosphere e.g. air the amount of oxygen is present generally in a mole ratio to the hexachloroethane or octachloropropane within the range of 1:1 to 10:1.

In a preferred embodiment, this invention contemplates the activation of a platinum-alumina composite which comprises treating a platinum-alumina composite with a solution of hexachloroethane in tetrachloroethylene in the presence of oxygen gas wherein the oxygen is present in a mole ratio to the hexachloroethane within the range of 1:1 to 10:1.

This invention also contemplates by the same method stated above the activation of an alumina composite containing another noble metal such as palladium, ruthenium or rhodium. In the activation of a palladium-alumina composite or a rhodium-alumina composite, for instance, the manipulative procedure is the same as for the activation of a platinum-alumina composite. Of these metals we prefer either palladium or platinum because of their availability. Both provide the desired catalyst activity when treated with the hexachloroethane or octachloropropane in a suitable solvent. It should also be noted that the process of this invention is also useful for the activation of an alumina composite not containing a noble metal. For instance, by the procedure of the instant invention we can activate eta-alumina to prepare a catalyst useful in certain hydrocarbon conversion processes such as polymerization and alkylation.

One mode of operating our invention is in accordance with the application entitled "Activation of Hydrocarbon Catalyst With Hexachloroethane" which is the invention of Messrs. E. T. Child, W. Lafferty, C. H. Ware, Jr. and H. D. Carter, Ser. No. 646,456, filed June 16, 1967, and assigned to the assignee hereof and now abandoned. In accordance with the method of that application, a bed of the alumina composite is placed in a suitable reactor over which is placed hexachloroethane and an inert solvent of the hexachloroethane is first passed through the hexachloroethane and thence through and in contact with the alumina-containing composite. The contacting in that case also takes place in a molecular oxygen containing atmosphere but in a less preferred embodiment takes place in a molecular chlorine or bromine atmosphere. In accordance with that disclosure there are two methods for the in situ preparation of the hexachloroethane solution. The hexachloroethane solution can be prepared by charging the suitable inert solvent down over the hexachloroethane thence through the alumina composite bed and out through a suitable opening at the bottom of the reactor. In another embodiment of that invention, hexachloroethane is placed on top of the alumina containing composite bed and a solvent of the hexachloroethane not deleterious to the alumina composite is refluxed through the composite in contact with the hexachloroethane in an atmosphere containing molecular oxygen, chlorine or bromine, preferably oxygen.

It has been found that tetrachloroethylene is an extremely suitable hexachloroethane or octachloropropane solvent and can be utilized to great advantage in the process of this invention. Other solvents of hexachloroethane which can be used in accordance with our invention include chloro or bromo hydrocarbons such as:

Trichloroethylene
Dibromomethane
1,1,2 trichloroethane
1,1,1,2 tetrachloroethane
1,1,2,2 tetrachloroethane
Tribromomethane In this regard any other distillation medium can be used provided it (1) dissolves hexachloroethane, (2) does not introduce any undesirable side reactions with the catalyst base and (3) boils in the desired temperature range without having to go to extremely high pressures. Since the reaction normally takes place under a pressure of 300–700 p.s.i.g. e.g. 400 p.s.i.g. it is not desirable to design the system for 1000 p.s.i.g. merely for this step.

The activation procedure is performed generally within the temperature range of about 300–800° F., preferably between 500 and 650° F. It should be realized that the temperature selected for the process will depend of course upon the boiling point of the solvent of the hexachloroethane. The solvent is employed in this invention to facilitate handling of the hexachloroethane at less than reaction temperatures i.e. room temperature up to the temperatures at which the solvent and solute are vaporized during the activation procedure. The vaporization of the activating agent is facilitated using a sufficient quantity of, say, air at a flow rate of about 10 cubic feet per hour air and a total 20 cubic centimeters per hour activator through the bed of alumina-metal composite.

The activation is generally performed at a pressure of between about 0 p.s.i.a. and 1000 p.s.i.g., preferably between 300 and 500 p.s.i.g. for preparation of a catalyst suitable for isomerization particularly isomerization of lower paraffins.

The activation is performed over a period of time sufficient to render the catalyst sufficiently active for the purpose of employment in a commercial sized hydrocarbon conversion process normally performed using high space velocities and large quantities of materials. Generally speaking, the activation of the alumina composite or alumina-noble metal composite is done over a period of time of between about 2 and 16 hours.

In the activation of the alumina composite with the hexachloroethane an oxygen stream is passed through the composite in the manner of the aforementioned application. We have found that air can be used not only as a carried gas to assist in the passage of the hexachloroethane through the catalyst bed but also to supply the oxygen content required for the activation reaction itself. The flow rate of the oxygen content can vary within a wide range. Generally speaking it has been found convenient to have the gas pass through the alumina-containing composite at a rate of between about 1 and 50 pounds gas per hour per square foot.

The process can be performed using chlorine and/or bromine together with the hexachloroethane. The amount of chlorine and/or bromine is within the range of about 1 to 50 lbs./hr. per square foot reactor cross sectional area depending upon the temperature employed and the specific solvent utilized. Use of a larger quantity of chlorine and/or bromine merely increases the cost of operating the process.

The process of the invention can be performed in accordance with several different modes in addition to those preferred modes set forth which preferred modes are the inventive subject matter of the copending application. Specifically, if desired one can recover the solution of hexachloroethane in the solvent and recycle it through the zone containing the alumina composite to be activated until the composite has achieved sufficient activity. The process can also be performed by having a bed of hexachloroethane within the bed of alumina composite in a sandwich fashion and passing solution of hexachloroethane in tetrachloroethylene over the alumina composite in the bed. Thus, any of the hexachloroethane lost in the alumina is replenished in solution form as the solution passes down through the layer of hexachloroethane within the alumina.

In order to more fully illustrate the nature of the invention and the manner of practicing the same, the following examples are presented. These examples illustrate the best modes contemplated for carrying out our invention.

EXAMPLE I

Into a nickel vessel was charged 775 cc. of a platinized alumina base composite weighing 580 grams. Over the catalyst and within the catalyst in the form of two layers were placed 214 grams of hexachloroethane solid. The hexachloroethane occupied a volume of 200 cc. The bed was heated to a temperature of about 535° F. and a tetrachloroethylene was passed first over the hexachloroethane and thence through the alumina-containing composite bed in a downflow direction at a rate of 39–42 cc. tetrachloroethylene per hour. While dissolved hexachloroethane was passing through the alumina-containing particles in the tetrachloroethylene solvent, air was passed through the bed as a carrier gas and also as an oxygen gas and also as an oxygen-containing stream. The air passed through the alumina-containing composite bed at a rate of about 270 pounds per hour per square foot of reactor cross-section. The hexachloroethane solution was withdrawn through holes in the bottom of the reactor and recovered for further use in a subsequent activation procedure.

After about 4 hours, the bed was heated to 800° F. while hydrogen passed through the same at a rate of about 18.9 pounds per hours per square foot of reactor cross-section. The pressure on the system was 400 p.s.i.g. After about 2 hours, the temperature was decreased to 350° F. with continuing hydrogen flow through the composite bed at the same rate of 18.9 pounds per hour per square foot of reactor cross-section. When the temperature had decreased to 350° F. hydrogen chloride gas was passed therethrough at a rate of about 0.7 cubic foot per hour together with the hydrogen gas. This continued for about three hours while the system was maintained at atmospheric pressure. The catalyst was withdrawn from the stream and evaluated. The above procedure represents the activation procedure of the alumina-containing composite and a stabilization procedure to preserve the life and the activity of the platinized alumina catalyst now containing chlorine thereon. The so-activated catalyst was evaluated for normal butane isomerization at 335° F., 500 p.s.i.g. and at a hydrogen to normal butane mol ratio of 0.2. It was evaluated at three different liquid hourly space velocities, namely 2, 4 and 8. It showed a conversion to isobutane of 60 weight percent, 58 weight percent, and 44 weight percent respectively for the above liquid hourly space velocities under the above process parameters. (Equilibrium conversion of normal butane to isobutane is about 63 weight percent at the above conditions.)

EXAMPLE II

Into a nickel vessel fitted for refluxing was charged 500 cubic centimeters (375 grams) of a platinized alumina composite resting on Berl saddles beneath which was about 557 cubic centimeters of tetrachloroethylene. 101 grams of hexachloroethane crystals were placed on top of the 375 grams of platinized eta alumina. The reactor was pressured with 300 p.s.i.g. of air and the bottom portion of the reactor was heated to the boiling point of the tetrachloroethylene. The tetrachloroethylene then began to reflux up through the catalyst bed. The reflux enabled the tetrachloroethylene to pass up through the platinized alumina composite as a vapor phase or as a vapor-liquid equilibrium component. The reflux and accompanying rise in temperature dissolved the layer of hexachloroethane crystals placed on top of the catalyst. This allowed the hexachloroethane to come in intimate contact with the composite bed. The dissolved and vaporized hexachloroethane was thus refluxed up and down the catalyst bed by carefully controlling the reboiling temperature and reactor pressure through use of the air or oxygen gas.

The so activated platinized alumina composite was stabilized by heating at a temperature at 800° F. and under pressure of 400 p.s.i.g. while a stream hydrogen at a rate of 18.9 pounds per hour per square foot of reactor cross-section passed through the catalyst. This heat continued for two hours. After it had been heated at 800° F. for the two hours, the temperature was decreased to 350° F. and the pressure was decreased to 1 atmosphere. Hydrogen passage through the catalyst bed continued at a rate of 18.9 pounds per hour per square foot of reactor cross-section while hydrogen chloride gas together with hydrogen gas passed through the catalyst composite at a rate of 0.7 cubic foot per hour. This treatment continued for three hours. The so activated and stabilized catalyst was evaluated for normal butane isomerization at 335° F., 500 p.s.i.g. and a mol ratio of hydrogen to normal butane of 0.2. The evaluation was performed at three different space velocities i.e. 2 LHSV, 4 LHSV and 8 LHSV and showed a conversion to isobutane respectively of 55 weight percent, 39 weight percent and 27 weight percent.

EXAMPLE III

Into a vessel was charged 166 grams of an eta alumina composite containing 0.6 weight percent platinum thereon, the composite in the form of 1/16 inch extrusions. To the vessel maintained at a temperature of 500° F. and under a pressure of 400 p.s.i.g. was charged a solution of hexachloroethane in tetrachloroethylene for two hours. The amount of hexachloroethane charged in the two hour period was 6.4 grams and the amount of tetrachloroethylene was 25.6 grams. The flow rate of the hexachloroethane through the bed of alumina-platinum particles was 3.2 grams per hour. The mole ratio of hexachloroethane to tetrachloroethylene was 1:4. While the solution was admitted to the vessel, air passed through the bed of alumina composite at a rate of 10 cubic feet per hour. After a 2 hour period had elapsed, the temperature was raised to 650° F. and for five hours a solution of hexachloroethane in tetrachloroethylene passed therethrough. The total amount of hexachloroethane used was about 28 grams and the total amount of tetrachloroethylene solvent was 128 grams. During this additional five hours of activation the flow rate of the hexachloroethane through the platinized alumina composite was 6.4 grams per hour. The resultant activated catalyst contained 9.6 percent by weight chlorine thereon. It was "stabilized" to impart to it long life by heating in the presence of a hydrogen sweep at 800° F., the hydrogen passing therethrough at a rate of 5 cubic feet per hour for four hours. After that, the composite was treated with a mixture of hydrogen and HCl at a rate of 0.5 cubic foot per hour over a 1 hour span. The resultant so treated catalyst was evaluated for n-hexane isomerization at 300° F., 300 p.s.i.g. in the presence of hydrogen with a hydrogen to hydrocarbon mole ratio of 3:2:1. The liquid hourly space velocity of the normal hexane was 1. The evaluation data showed a conversion of the n-hexane to 3 methyl pentane of 20.5 percent, to a mixture of 2 methyl pentane and 2,3 dimethylbutane of 44.4 percent and to 2,2 dimethylbutane of 22.8 percent. The amount of the n-hexane remaining unconverted was about 12.3 percent.

EXAMPLE IV

In a manner similar to Example III 166 grams of a platinized-alumina composite were activated using a solution of hexachloroethane and tetrachloroethylene of the same strength employed in Example III. The total amount of hexachloroethane employed was about 71.7 grams and the total amount of tetrachloroethylene was 286.7 grams. The activation was performed over a 14 hour period with an air flow rate therethrough of 10 cubic feet per hour and a hexachloroethane flow rate of 5.12 grams per hour. The pressure was 400 p.s.i.g. and the temperature was 550° F. A portion of the catalyst was evaluated for n-hexane isomerization using the parameters in Example III. It showed conversion to 3 methyl pentane of 20.6 percent, to a mixture of 2 methyl pentane and 2,3 dimethylbutane of 47.1 percent and to 2,2 dimethylbutane of 20.4 percent. The remaining portion of the activated catalyst was "stabilized" as in Example III and provided a composite containing 8.1 percent by weight chlorine thereon. It provided a yield of 20.5 percent for 3 methyl pentane, of 42.1 percent for the mixture of 2 methyl pentane and 2,3 dimethylbutane and of 24.4 percent for 2,2 dimethylbutane, using the same isomerization conditions as in Example III.

EXAMPLE V

In the manner of Example III, 166 grams of a platinum alumina composite were charged into the vessel to which was admitted over a period of 12 hours a solution of hexachloroethane and tetrachloroethylene having a mole ratio, of hexachloroethane to tetrachloroethylene of 1:9 at a temperature of 550° F., and a pressure of 400 p.s.i.g. The total amount of hexachloroethane utilized was 35.8 grams, the total amount of tetrachloroethylene was 322.6 grams. The flow rate of the hexachloroethane through the platinized alumina composite was 3 grams per hour and the air flow rate was 10 cubic feet per hour. A portion of the so prepared catalyst was analyzed and found to contain 9.1 percent chlorine. It was evaluated for n-hexane isomerization using the parameters set forth in Example III. It showed a conversion of 19.6 percent to 3 methyl pentane, 46.3 percent to a mixture of 2 methyl pentane and 2,3 dimethylbutane and 22.5 percent to 2,2 dimethylbutane. A portion of the so prepared catalyst was stabilized in the manner of Example III and provided a catalyst having 8.3 percent chlorine thereon. It was evaluated for isomerization of n-hexane using the same parameters. It showed a conversion of 3 methyl pentane of 18.1 percent, to a mixture of 2 methyl pentane and 2,3 dimethylbutane of 41.9 percent and to 2,2 dimethylbutane of 29.5 percent. Only 10.4 percent of the n-hexane charged remained unisomerized. Substantially the same results were employed using a solution of hexachloroethane and tetrachloroethylene in a ratio of 1:19. This activation was performed over 12 hours, the flow rate of the hexachloroethane through the catalyst bed being 1.3 grams per hour. Only 12.2 percent of n-hexane remained unisomerized employing the conditions of Example III.

The above disclosure and examples illustrate the preferred methods of performing our invention. It can be seen from these examples that we have provided a commercially significant useful method for utilizing this valuable activating agent for activating alumina based catalysts. Thus our method overcomes the difficulties heretofore experienced in utilizing the hexachloroethane as activating agent as for alumina or alumina containing catalyst. The process does not diminish the activating properties of the hexachloroethane as can be seen from the normal butane evaluations reported in the examples. Specifically, a 60 percent weight yield isobutane compared with the theoretical of 62 weight percent is considered a good conversion when considering the problems encountered in activating the platinized alumina with hexachloroethane. Additionally, it is observed from Examples III–V that excellent yields of n-hexane isomers are obtained using a catalyst base activated by our method. It should also be noted that the process of the instant invention provides synergistic results due to the fact that the results obtained are substantially better then when using another multi-carbon activating compound in an oxygen containing atmosphere.

The terms and expressions used herein have been used for purposes of illustration and not of limitation as there is no intention, in the use of such terms, of excluding any equivalents or portions thereof, as there may be many modifications and departures from the above specific disclosure without departing from the spirit and scope of the invention claimed.

What is claimed is:

1. A process for activating an alumina composite to render it active as a catalyst for hydrocarbon conversion which comprises forming a solution of hexachloroethane in a solvent selected from the group consisting of tetrachloroethylene, trichloroethylene, dibromomethane, 1,1,2-trichloroethane, 1,1,1,2-tetrachloroethane, 1,1,2,2-tetrachloroethane, and tribromomethane, vaporizing said solution into an atmosphere comprising molecular oxygen, chlorine or bromine and contacting said alumina composite with said atmosphere at a temperature of about 400° F. to 650° F. at a pressure of between about 0 p.s.i.a. and 1,000 p.s.i.g. for a period of between about 2 and 10 hours.

2. A process for activating noble metal containing alumina composites to render them active as catalysts suitable for the isomerization of saturated hydrocarbons, comprising forming a solution of hexachloroethane in a halogenated solvent selected from the group consisting of tetrachloroethylene, trichloroethylene, dibromomethane, 1,1,2-trichloroethane, 1,1,1,2-tetrachloroethane, 1,1,2,2-tetrachloroethane and tribromomethane, vaporizing said halogenated solution containing hexachloroethane in an atmosphere selected from the group consisting of bromine, chlorine and atmospheres containing molecular oxygen and contacting said alumina composite with the combination of hexachloroethane and halogenated solvent in said atmosphere, wherein the weight ratio of alumina to the hexachloroethane present ranges from 2.3:1 to 26.0:1, at a temperature ranging from about 400° F. to 650° F. at a pressure of between about 300 and 500 p.s.i.g. for a period of between 2 and 10 hours, until said activated alumina composite is formed.

3. The process of claim 2 wherein the alumina composite contains platinum, the solvent is tetrachloroethylene, the atmosphere is one containing molecular oxygen and wherein the amount of oxygen present is in a mole ratio to the hexachloroethane of between 1:1 to 10:1.

4. The process of claim 3 wherein the atmosphere is air.

5. The process of claim 3 wherein the atmosphere is oxygen.

6. In a process for activating noble metal containing alumina composites by the vaporization of solid hexachloroethane to render said composites active as isomerization catalysts for the isomerization of paraffinic hydrocarbons in an inert atmosphere, at activation temperatures ranging from about 300° F. to 800° F., in a pressurized environment ranging between about 300 and 700 p.s.i.g., for a period between about 2 and 16 hours, the improvement comprising contacting the alumina composites with the hexachloroethane in the form of halogenated solvent solutions, said solvent being selected from the group consisting of trichloroethylene, tetrachloroethylene, dibromomethane, 1,1,2-trichloroethane, tribromomethane, 1,1,1,2-tetrachloroethane and 1,1,2,2-tetrachloroethane at temperatures from about 400° to 650° F. in the vaporized state in the presence of an oxidizing atmosphere selected from the group consisting of chlorine, bromine, air and oxygen, until said activation of the composites takes place.

7. A process for preparing an activated alumina composite catalyst suitable for isomerizing saturated hydrocarbons to their saturated counterparts, comprising the steps of:
(a) contacting each part by weight of alumina composite to be activated in an oxidizing atmosphere with from ½ to 1/26 its weight of hexachloroethane dissolved in at least a solubilizing amount of at least one halogenated organic solvent for hexachloroethane, said solvent being selected from the group consisting of tetrachloroethylene, trichloroethylene, dibromomethane, 1,1,2-trichloroethane, 1,1,1,2-tetrachloroethane, 1,1,2,2-tetrachloroethane, and tribromomethane,
(b) continuing said contact of said alumina composite with said halogenated solution containing hexachloroethane in said oxidizing atmosphere at elevated temperatures ranging between about 400° F. and 650° F. at superatmospheric pressures ranging from about 300 p.s.i.g. to about 500 p.s.i.g. so that said contact of said alumina with said solution is in the vaporized form, for a period of time ranging from about 2 to 10 hours, said oxidizing atmosphere being brought in contact with said alumina composite at a rate between about 1 and 50 pounds per hour per square foot of alumina composite present until an activated alumina catalyst composite suitable for isomerizing saturated hydrocarbons is produced.

8. The process of claim 7 wherein the alumina composite contains platinum and the halogenated solvent is tetrachloroethylene.

References Cited

UNITED STATES PATENTS

| 3,235,617 | 2/1966 | Happel | 260—678 |
| 3,424,697 | 1/1969 | Notari | 252—430 |
| 3,240,840 | 3/1966 | Gobel | 260—683.47 |
| 3,253,055 | 5/1966 | Gobel | 260—683.75 |

DANIEL E. WYMAN, Primary Examiner

P. M. FRENCH, Assistant Examiner

U.S. Cl. X.R.

252—441